Dec. 11, 1934.  B. H. BROWALL  1,983,897
AUTOMATIC SLACK ADJUSTER FOR BRAKES
Filed Jan. 3, 1933  4 Sheets-Sheet 1
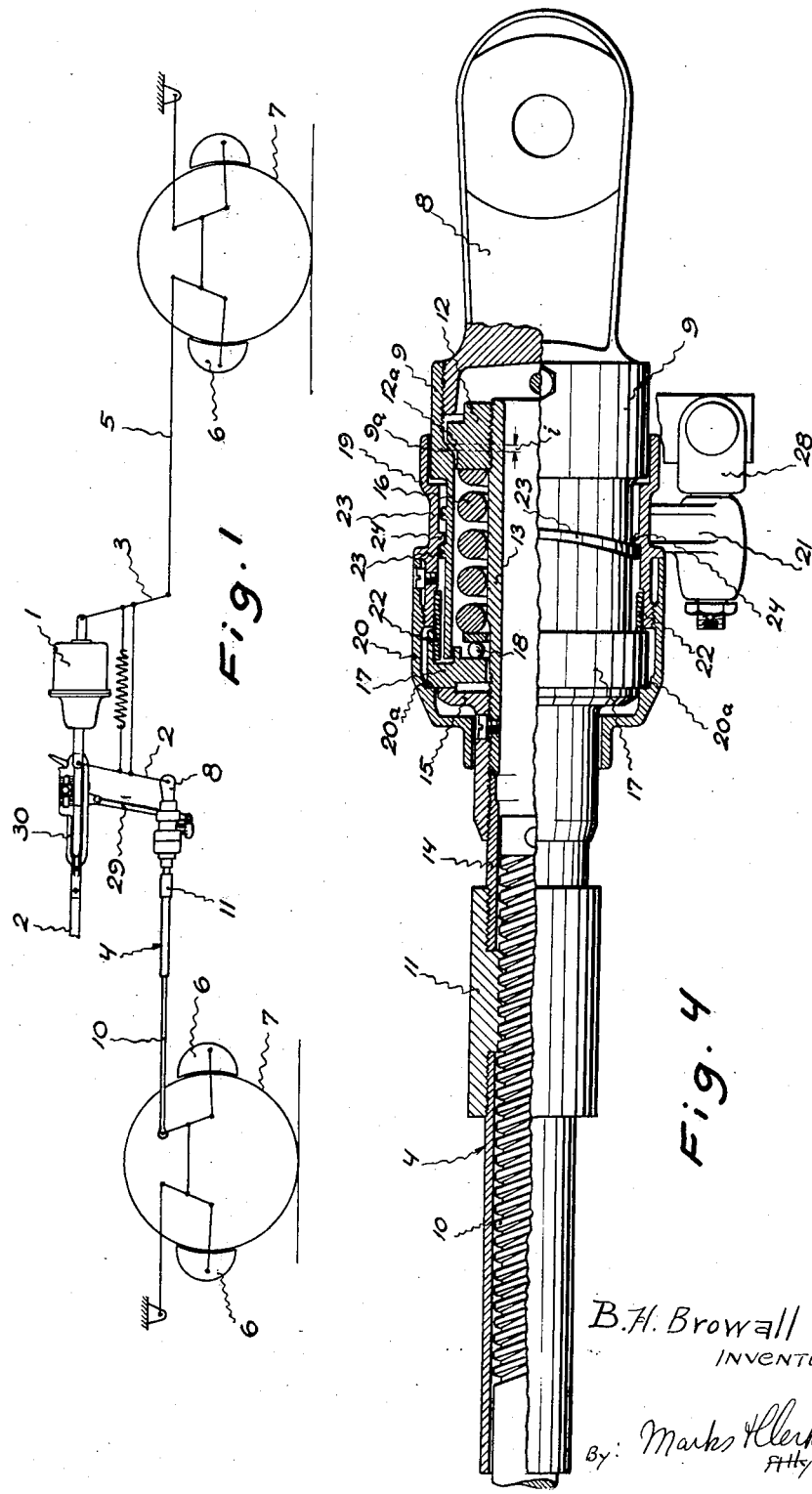

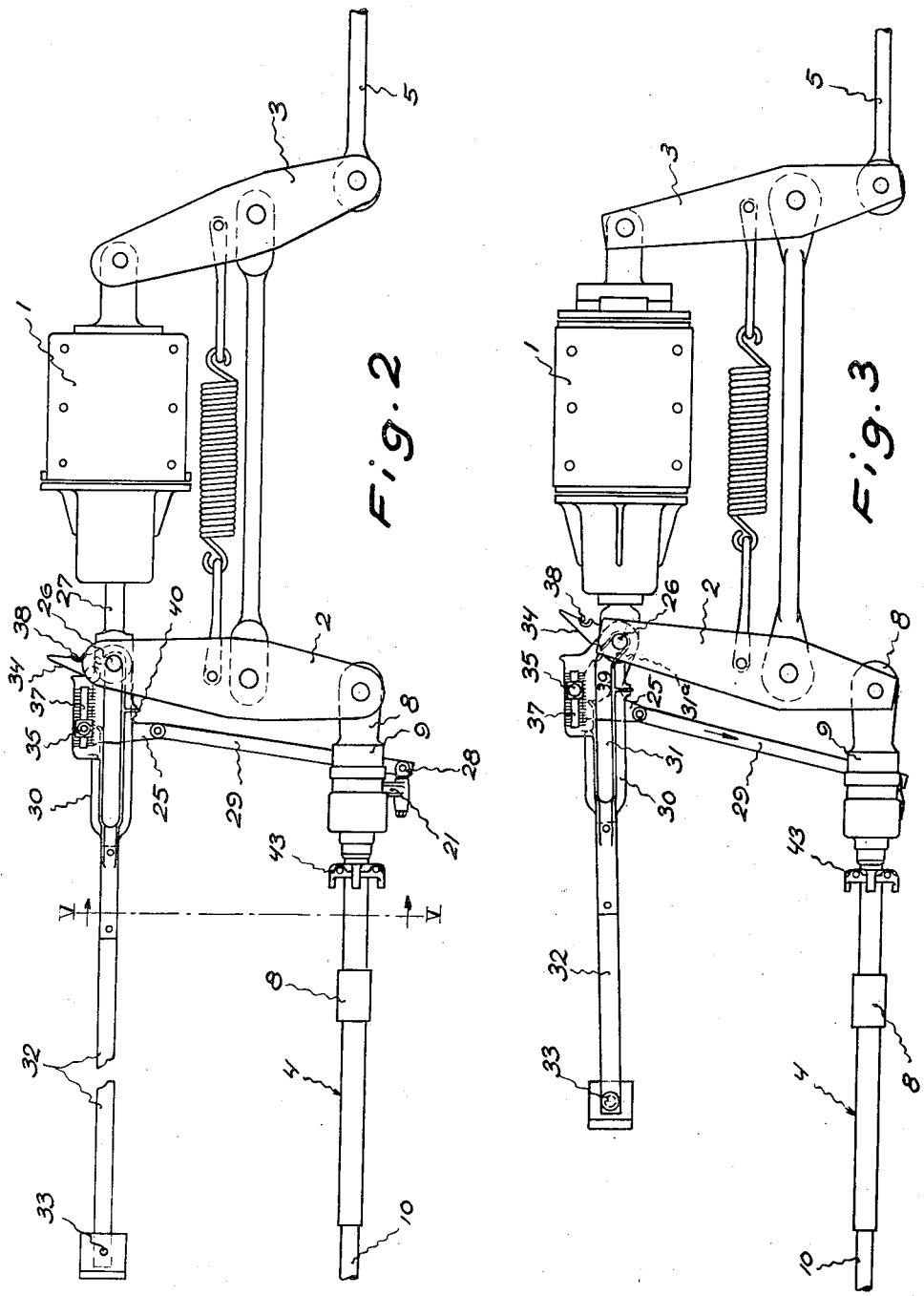

Dec. 11, 1934.     B. H. BROWALL     1,983,897
AUTOMATIC SLACK ADJUSTER FOR BRAKES
Filed Jan. 3, 1933     4 Sheets-Sheet 3
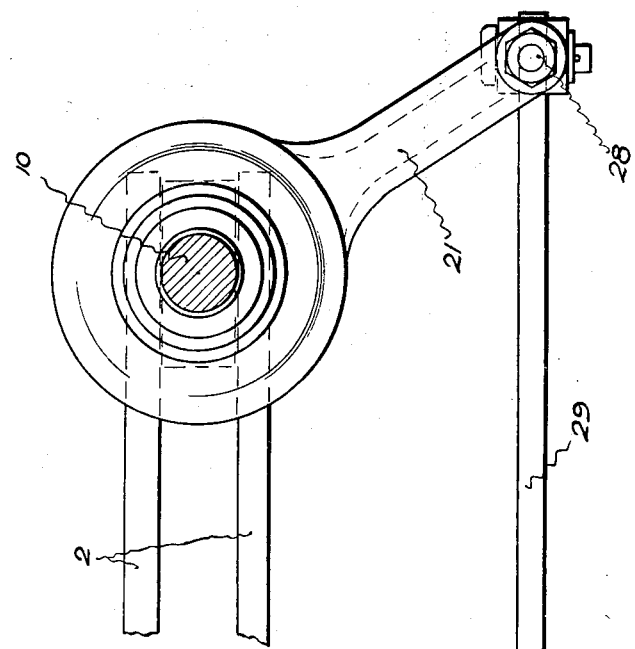
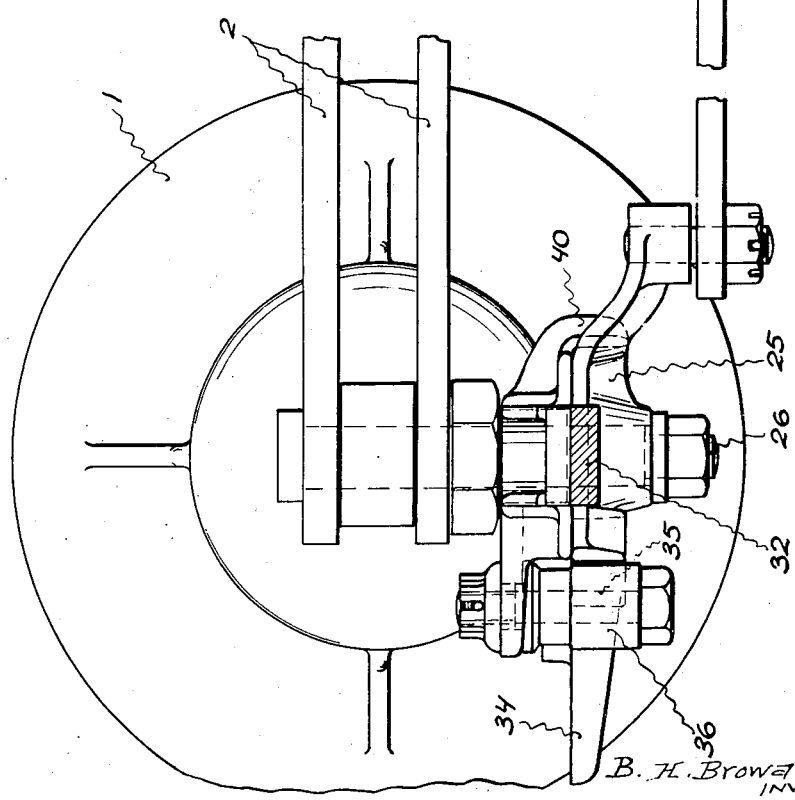

Dec. 11, 1934.  B. H. BROWALL  1,983,897
AUTOMATIC SLACK ADJUSTER FOR BRAKES
Filed Jan. 3, 1933   4 Sheets-Sheet 4

B. H. Browall
INVENTOR

By: Marks & Clerk
Attys.

Patented Dec. 11, 1934

1,983,897

UNITED STATES PATENT OFFICE 1,983,897

AUTOMATIC SLACK ADJUSTER FOR BRAKES

Bert Henry Browall, Malmo, Sweden, assignor to Svenska Aktiebolaget Bromsregulator, Malmo, Sweden, a corporation of Sweden Application January 3, 1933, Serial No. 650,021

8 Claims. (Cl. 188—202)

My present invention relates to automatic slack adjusters for brakes for railway cars and the like, and the chief object thereof is to provide an efficient and reliable slack adjuster of the adjusting-screw type, which is of relatively simple construction and operates automatically during the application stroke of the brake piston for increasing the slack if it is too small and during the return stroke of the brake piston at the release of the brake for reducing the slack if it is too large.

Further objects of my invention will be apparent from the following detailed description of a preferred embodiment thereof, reference being had to the accompanying drawings, in which:—

Figure 6:
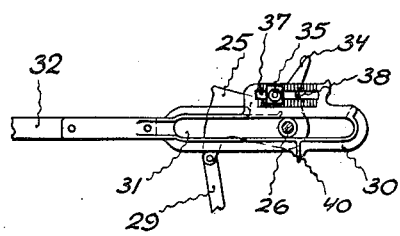
Figure 7:
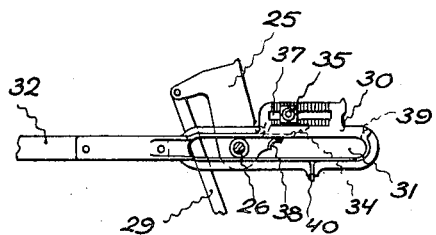
Figure 8:
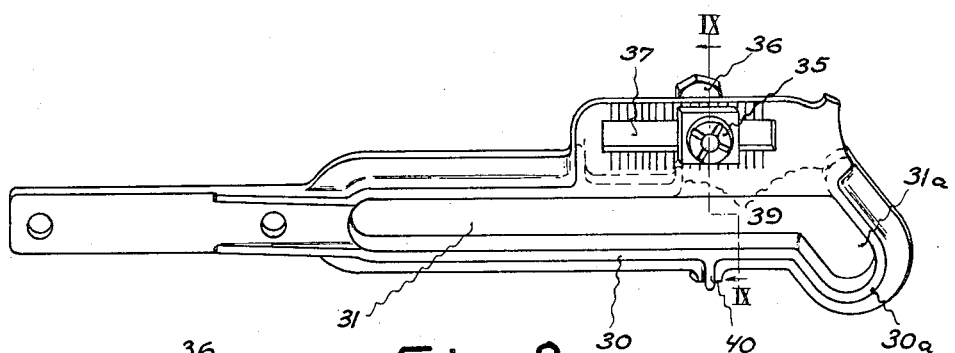
Figure 9:
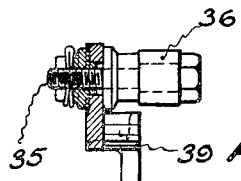
Figure 10:
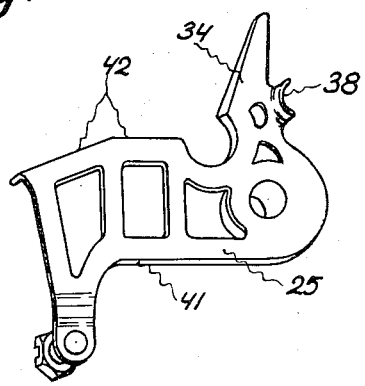

Fig. 1 is a diagrammatic illustration, by way of example, of a conventional type of railway brake system provided with a slack adjuster embodying my invention, the brake cylinder and adjacent parts of the brake rigging being shown in plan view and the car wheels and adjacent parts of the brake rigging in elevation. Fig. 2 is a plan view of the brake cylinder and adjacent parts of the brake rigging, including the slack adjuster and the actuating means therefor. Fig. 3 is a similar view illustrating a modified form of the actuating means for the slack adjuster. Fig. 4 is a detail plan view, partly sectional, of the slack adjuster. Fig. 5 is a detail end view, partly sectional on the line V—V of Fig. 2, of the slack adjuster and the actuating means therefor. Figs. 6 and 7 are diagrammatic plan views of the actuating means for the slack adjuster in different working positions. Fig. 8 is a perspective detail view of the guide plate of the actuating means according to the modified form thereof illustrated in Fig. 3. Fig. 9 is a detail cross section of the said guide plate on line IX—IX of Fig. 8. Fig. 10 is a perspective detail view of the actuating crank pertaining to the modified construction of the actuating means illustrated in Fig. 3.

Referring to Figs. 1-3, the conventional type of railway car brake system shown comprises the brake cylinder 1, the live and dead levers 2 and 3 respectively, and the pull rods 4 and 5 which connect to the said levers 2 and 3 the levers and beams carrying the brake shoes 6 for coaction with the car wheels 7. The slack adjuster forms the rod 4, or a portion thereof; but as will be apparent to those skilled in the art the slack adjuster embodying my invention may be mounted as well at any other suitable place in the brake rigging, and it may be utilized as well in other suitable brake rigging types, including brake riggings of the variable leverage type, than the conventional type of brake rigging shown in the accompanying drawings for the purpose of exemplification only.

Referring to Fig. 4, the slack adjuster proper comprises a non-rotatable head 8 having an extension sleeve 9 secured thereto, a non-rotatable adjusting screw 10 and a rotatable section interconnecting the said non-rotatable head and the adjusting screw and including an adjusting nut 11 engaging the adjusting screw 10, so that by rotation of the adjusting nut 11 on the adjusting screw 10 in one direction or the other the length of the rod 4 formed by the slack adjuster is increased or reduced for increasing or reducing the slack between the brake shoes 6 and the wheels 7. Besides the adjusting nut 11 the said rotatable section comprises a retaining ring 12 and two hollow rod parts 13 and 14 interconnecting the retaining ring 12 and the adjusting nut 11. A friction clutch sleeve 15 is affixed to and unites the adjacent ends of the rod parts 13, 14. If desirable for the strength of the mechanism, the rod part 13 carrying the retaining ring 12 directly affixed thereto may be made as a solid rod in which case the length of the hollow rod part 14 should be correspondingly increased to allow for a sufficient movement of the nut 11 on the spindle 10. A coiled spring 16 is interposed between the retaining ring 12 and a friction clutch ring 17 coacting with the clutch sleeve 15. An antifriction thrust ball bearing 18 is inserted between the said clutch ring 17 and the adjacent end of the coiled spring 16. The thrust bearing, however, may as well be inserted between the other end of the spring 16 and the retaining ring 12. Surrounding the sleeve 9 and the clutch members 15, 17 there is a rotatable mechanism casing comprising two interconnected parts 19 and 20, the former of these parts being provided with a crank arm 21 for connecting the said mechanism casing to the actuating means for the slack adjuster in a manner to be described in the following. The rotatable mechanism casing and the clutch ring 17 are interconnected by means of a ratchet mechanism or one way clutch adapted to allow for relative rotation between the said casing and the clutch ring 17 in one direction only. In the embodiment shown this one way clutch consists of a right hand coiled spring 22 fitting aligned internal surfaces on the members 17 and 19. As is well known in the art the spring 22 is tending to increase its diameter and locks the members 17 and 19 together when a torque is applied tending to relatively rotate the members 17 and 19 in a direction to unwind the spring 22, whereas, when a torque is applied tending to relatively rotate the members 17 and 19 in the opposite direction, the spring 22 reduces its diameter and permits the said relative rotation of the members 17 and 19 if the said torque becomes sufficient for overcoming a moderate initial adhesion of the spring 22 to the members 17 and 19. The sleeve 9 and the mechanism casing are provided with cooperating external and internal left handed screw threads 23 and 24 respectively. The retaining ring 12 has an axial play relatively to the sleeve 9, and said sleeve and retaining ring are provided with cooperating conical abutment and clutch faces 9$^a$ and 12$^a$ respectively. There is also a limited axial play between the threads 23 and 24 on the sleeve 9 and the mechanism casing respectively, and the part 20 of the casing is provided with an annular supporting face 20$^a$ for the friction clutch ring 17. The coacting threads of the screw 10 and nut 11 are right handed and of such a pitch as to be non-selflocking, and preferably the left handed screw threads 23, 24 are also non-selflocking, or very nearly so.

Referring to Figs. 2, 3 and 6–10 the actuating means for the slack adjuster comprises an actuating crank or rocking arm 25 rotatably mounted on the pivot bolt 26 in the head of the brake piston rod 27. A bolt 28 journaled at the end of the crank 21 on the mechanism casing is connected to the end of the actuating crank or rocking arm 25 by means of a link rod 29. The crank or rocking arm 25 cooperates with a relatively stationary guide plate 30 provided with a slot 31 for the bolt 26 and affixed to a rod 32 made to turn about a fixed point such as a bolt 33. The actuating crank 25 is provided with a projecting arm 34 adapted to cooperate with an abutment bolt 35 carried by the guide plate 30 and preferably provided with a roller 36. The bolt 35 is adjustable in a slot 37 in the guide plate 30. The arm 34 is provided with a projection 38. When the crank 25 is rotated due to the cooperation of the arm 34 with the bolt 35 during the brake piston movement at a braking operation, the projection 38 travels through a recess 39 in the adjacent edge of the slot 31 and then along the said edge so as to be guided thereby. At the edge opposite to the recess 39 the guide plate 30 is provided with a projection 40 forming an abutment for guiding and limiting the movement of the crank 25.

In the modification according to Figs. 3, 3, 9 and 10 the guide plate 30 has a bent or inclined end portion 30$^a$ providing a correspondingly bent or inclined end portion 31$^a$ of the slot 31.

The operation of the slack adjuster and the actuation means is as follows:—

In Fig. 4 the apparatus is shown with the parts in their normal position when the brake is released. In this position the rotatable section, including the rod parts 13, 14 and the nut 11 attached thereto, is coupled to the mechanism housing 19, 20 through the initial adhesion of the clutch spring 22 to the members 19 and 17 and through the friction cluch 15, 17, the spring 16 pressing the ring 17 in frictional contact with the sleeve 15. The threads 23 and 24 on the sleeve 9 and the mechanism casing respectively are arranged in such a manner that in the normal position there is a slack $i$ between the conical clutch faces 9$^a$ and 12$^a$ on the sleeve 9 and the retaining ring 12 respectively. Due to the movement of the brake piston at a braking operation the actuating crank 25 is rotated (compare Figs. 6 and 7 illustrating the actuating means in different working positions during a braking operation). The result of this rotation of the actuating crank 25 is a corresponding rotation of the mechanism casing 19, 20 in the direction for screwing the said casing on the sleeve 9 to the left in Fig. 4. This rotation of the mechanism casing 19, 20 does not of itself enforce such axial displacement, because of the fact that the threads 23, 24 have a considerable axial play, but it permits such axial displacement to take place under the action of the tension arising in the brake rigging when braking. This axial displacement of the casing 19, 20 to the left in Fig. 4 results in a reduction of the slack $i$ which becomes equal to nought after rotation of the mechanism casing in the aforesaid direction through a certain angle corresponding to the reaching of the position of the actuating crank 25 shown in Fig. 6. In case the slack between the shoes and the wheels is of the proper size at the beginning of the braking operation, the brake shoes abut against the wheels substantially in the moment the aforesaid slack $i$ becomes equal to nought.

If the slack between the shoes and the wheels is too small at the beginning of the braking operation so that the brake shoes abut against the wheels before the slack $i$ becomes equal to nought, i. e. before the actuating crank attains the position shown in Fig. 6, the spring 16 yields on account of the resulting increase of the stresses arising in the brake rigging, said stresses being transferred between the screw 10 and the head 8 through the nut 11, the rod parts 14, 13, the retaining ring 12, the spring 16, the thrust bearing 18, the ring 17, the casing 20, 19, the screw threads 24, 23 and the sleeve 9. Due to the yielding of the spring 16 under the increased stresses the friction clutch 15, 17 is released so that the rotatable section 11—16 will rest against the antifriction ball bearing 18, whereby the said rotatable section is relieved of frictional connection with the mechanism casing 19, 20 and the non-rotatable parts of the apparatus. Due to the torque arising between the non-selflocking threads of the screw 10 and nut 11 on account of the stresses in the brake rigging, the rotatable section 11—16 is forced to rotate in such a direction as to cause an increase in the length of the rod 4 through the nut 11 screwing out on the non-rotatable screw spindle 10. At this screwing out motion of the slack adjuster the nut 11 rotates in the direction of the continued rotation of the mechanism casing 19, 20, whereby the forces rotating the nut 11 and the mechanism casing respectively assist each other in effecting the desired screwing out motion of the slack adjuster and do not oppose or counteract each other as has been the case in such slack adjusters of the adjusting-screw type hitherto known, which operate automatically not only for reducing the slack when it is too large but also for increasing the slack when it is too small. Every forward motion of the brake piston thus produces a corresponding screwing-out motion of the slack adjuster, which may go on unrestricted until the brake piston has reached a point at which the actuating crank 25 has attained the position shown in Fig. 6. At this point the slack $i$ becomes equal to nought, and the stresses will now be transferred through the abutting faces 12$^a$ and 9$^a$, whereby these faces act as a frictional clutch locking the rotatable section 11—16 to the non-rotatable sleeve 9. From this moment at the braking operation the apparatus is locked and acts like a rigid or non-yielding pull rod. Now only the brake pressure, until this moment limited to the value determined by the power of the spring 16, can grow further during the continued piston movement allowed for by the elastic deflection of the brake rigging taking place at the increase of the brake pressure. At this continued movement of the brake piston the mechanism casing 19, 20 is rotated further in the same direction without resistance until the brake piston movement ceases and the actuating crank 25 has attained for instance the position shown in Fig. 7.

Consequently, when the slack between the shoes and the wheels has become too small, the slack adjuster at the first following braking operation is screwing out until the brake piston has travelled over a certain distance which represents the predetermined proper piston movement for moving the shoes over the said slack when it is of proper value. This piston movement, the so called application stroke, may be adjusted by adjustment of the abutment bolt 35 in the slot 37 in the guide plate 30 of the actuating device.

At the release of the brake the mechanism casing 19, 20 is rotated in the opposite direction back to its normal position. So long as the backward movement of the brake rigging continues, i. e. so long as the stresses in the brake rigging have not yet ceased, the rotatable section 11—16 is blocked against rotation by the clutch $9^a, 12^a$. The clutch ring 17, being coupled to the mechanism casing in the backward direction of rotation of the latter by means of the clutch spring 22, is forced to partake in this rotation of the mechanism casing, but the only effect will be that the clutch 15, 17 slips during this movement. In the moment the braking stresses in the brake rigging cease, i. e. when the shoes leave the wheels, the clutch faces $12^a, 9^a$ cease to be pressed against each other. The rotatable section 11—16 now partakes in the rotation of the mechanism casing and is screwed in on the screw spindle 10 so as to reduce the length of the pull rod 4. Consequently, at the release of the brake for each braking operation the slack adjuster is screwing in with a quantity which is the greater the earlier the shoes leave the wheels, i. e. the more the slack between the shoes and the wheels is too large. Thus, when the said slack is too large, the slack adjuster is screwing in at the release of the brake for each braking operation until the application stroke of the brake piston is restored to its proper value. The small distance the slack adjuster is screwing in during the return movement of the actuating crank 25 from the position shown in Fig. 6 to the normal position, is compensated at the next braking operation before the application of the shoes against the wheels, because of the tendency of the rotatable section 11—16 to partake in the rotation of the mechanism casing 19, 20 during the movement of the actuating crank 25 from its normal position until the moment the clutch $9^a, 12^a$ is engaged. This tendency originates from the fact that during the whole of the setting movement of the brake rigging a certain tension always arises, due to frictional resistance to the movement etc. If this tendency should fail on some car, however, the normal automatic screwing-out operation described above may come into action for compensating any excessive adjustment.

In case the actuating device for the slack adjuster accidentally should fail to operate, due, for instance, to the connecting rod 29 getting loose, the rotatable section 11—16 is automatically locked to the non-rotatable sleeve 9 as soon as tension arises in the brake rigging for instance at a braking operation, because the nut 11 is forced by such tension to rotate in the direction for screwing the mechanism casing 19, 20 on the sleeve 9 to the left in Fig. 4. Because the threads 23 and 24 are not selflocking or are on the point of being not selflocking and are oppositely handed to the threads of the nut 11 and spindle 10, the mechanism casing meets with no or but a slight resistance against rotation in this direction so that the mechanism casing willingly or readily follows the rotation of the rotatable section 11—16 until the slack $i$ is reduced to nought and the clutch faces $12^a$ and $9^a$ of the retaining ring 12 and the sleeve 9 respectively are securely locked together. When the slack adjuster is thus locked against screwing in and out motions it acts as a rigid or non-adjustable connecting bar in the brake rigging until the actuating device is again put in order. Thus it will be seen that the brake is not put out of working order through an accidental failure of the actuating device for the slack adjuster.

The locking of the slack adjuster against screwing in or out motions through rotation of the mechanism casing for throwing the retaining ring 12 into engagement with the non-rotatable sleeve 9 may be utilized also for preventing unintentional operation of the slack adjuster at released brake due to such stresses in the brake rigging as may arise due to impact and inertia when running cars against each other or against stop buffers. For this purpose the actuating device may be constructed to function in such a manner as to effect or permit at the end of the return stroke of the brake piston a rotation of the mechanism casing in reversed direction through a sufficient angle for bringing the retaining ring 12 in locking engagement with the sleeve 9. In the modification according to Figs. 3 and 8 this reversed rotation of the mechanism casing at the end of the return piston stroke is effected through the bent or inclined end portion $31^a$ of the slot 31 in the guide plate 30. When at the return piston stroke the pivot bolt 26 enters the bent or inclined end portion $31^a$ of the slot 31, the guide plate 30 is displaced laterally, whereby the actuating crank 25 is rotated by the action of the projection 40 on the edge 41 of the crank 25 in such a direction and to such an extent as to cause the desired reversed rotation of the mechanism casing 19, 20. In this embodiment preferably the edge of the crank coacting with the roller 36 is made in the form of a broken line, as shown at 42. When at the beginning of a braking operation the bolt 26 leaves the inclined end portion $31^a$ of the slot 31, the guide plate 30 and the actuating crank 25 are straightened out into the same normal starting position as with a straight guide-plate. In all other respects than the described action at released position of the brake, the operation of the modified construction according to Figs. 3 and 8–11 is the same as that described in the foregoing with reference to Figs. 1, 2, 4, 6 and 7.

The nut 11 may be rotated by hand for increasing the slack between the shoes and the wheels for facilitating repairs and renewal of the shoes. In order to facilitate such rotation which must take place against the force of the friction clutch 15, 17 and by slipping the same, the rod part 14 is provided with a collar 43, Figs. 2 and 3, provided with projecting studs to be engaged by a suitable wrenching bar. No manual adjustment of the slack or slack adjuster after renewal of the brake shoes is necessary.

From the above description of the operation of the apparatus it should be apparent to those skilled in the art that an essential feature of the invention resides in the fact that the threads of the spindle 10 and nut 11 and the threads 23 and 24 of the sleeve 9 and the mechanism casing 19 respectively are inclined in opposite directions, i. e. are right and left handed respectively. It should also be apparent that it is highly preferable, although not absolutely necessary, that the threads 23, 24 are non-selflocking, or are on the point of being non-selflocking, and that any suitable means such as interposed anti-friction balls or the like may be used, if desired, to reduce the friction between the threads 23, 24 in order to allow for a relatively small inclination of said threads while still retaining the threads substantially on the point of being non-selflocking. When using a coiled spring such as the spring 22 for coupling the mechanism housing and the clutch ring 17 together in such a manner as to allow for relative rotation thereof in one direction only, the said spring must be wound in opposite direction to the threads 23, 24. The spring 22 may be replaced by, for instance, a pawl and ratchet mechanism, and also in other respects the construction of the slack adjuster may be varied without departing from my invention or the scope of the appendant claims. For instance the construction of the slack adjuster may be varied so as to make it work when applying it in a thrust rod instead of in a pull rod in the brake rigging.

What I claim and desire to secure by Letters Patent is:—

1. In an automatic slack adjuster of the character described for brakes on railway vehicles and the like, a rod mounted in the brake rigging and including two parts having a non-self-locking threaded connection between them, one of said parts being rotatable in both directions, in relation to the other for increasing and reducing, respectively, the slack and adapted to be rotated in the direction for increasing the slack through the tension arising in the brake rigging when braking, means for limiting rotation of said rotatable part of said rod in the direction for increasing the slack at a certain point in the braking movement, said means including a rotatable member on said rod and an actuating device operatively connected to the brake structure and adapted to rotate said rotatable member in the direction of rotation of said rotatable part of said rod for increasing the slack at the application stroke of the brake piston and in the reverse direction at the return stroke of the brake piston, and means for clutching said rotatable part of said rod to said rotatable member at the rotation of said rotatable member in the reverse direction, that is in the direction, for reducing the slack.

2. In an automatic slack adjuster of the character described for brakes on railway vehicles and the like, a rod mounted in the brake rigging and including two parts having a non-self-locking screw threaded connection between them, one of said parts being rotatable in both directions in relation to the other for increasing and reducing, respectively, the slack and adapted to be rotated in the direction for increasing the slack through the tension arising in the brake rigging when braking, means for stopping rotation of said rotatable part of said rod in the direction for increasing the slack at a certain point in the braking movement, said means including a rotatable member on said rod and being adapted to be set into action through rotation of said rotatable member through a certain angle in the direction of rotation of said rotatable part of said rod for increasing the slack, an actuating device operatively connected to the brake structure and adapted to rotate said rotatable member in the last-mentioned direction at the application stroke of the brake piston and in the reverse direction at the return stroke of the brake piston and means for clutching said rotatable part of said rod to said rotatable member at the rotation of said rotatable member in the reverse direction, that is in the direction for reducing the slack, said rotatable member being adapted, upon failure of said actuating device at a braking operation, to follow any rotation of said rotatable part of said rod, which is caused by the tension arising in the brake rigging, until through said rotation of said rotatable member the rotation of said rotatable part of said rod is stopped.

3. An automatic slack adjuster as set forth in claim 1, in which the actuating device is adapted at the end of the return stroke of the brake piston to rotate the rotatable member on the rod through such an angle and in such direction as to set the means for limiting rotation of the rotatable part of the rod into action, and at the very beginning of the application stroke of the brake piston to rotate the said rotatable member through the same angle in the reverse direction.

4. In an automatic slack adjuster of the character described for brakes on railway vehicles and the like, a rod mounted in the brake rigging and comprising two non-rotatable parts and a rotatable section interconnecting the said non-rotatable parts and having a non-self-locking screw threaded connection with one of said non-rotatable parts and adapted to be rotated in the direction for increasing the slack through the tension arising in the brake rigging when braking, and means for stopping rotation of said rotatable section at a certain point in the braking movement and for rotating said rotatable section in the reverse direction, that is in the direction for reducing the slack, said means comprising a rotatable member on the other of said rotatable parts of the rod, an actuating device operatively connected to the brake structure and adapted to rotate said rotatable member in the direction of rotation of said rotatable section for increasing the slack at the application stroke of the brake piston and in the reverse direction at the return stroke of the brake piston, camming threads on said rotatable member and the second-mentioned non-rotatable part of the rod, said threads being threaded in opposite direction to the screw threads connecting the rotatable section to the first-mentioned non-rotatable part of the rod and leaving between them an axial play and clutch means provided between the said rotatable member and the said rotatable section and comprising an intermediate, rotatable member, a friction clutch member on the said rotatable section for coaction with the said intermediate, rotatable member, a one-way drive connection between the first-mentioned rotatable member and the said intermediate, rotatable member, a spring interposed between the said rotatable section and the said intermediate, rotatable member and biassing the latter towards the said friction clutch member, an axial abutment on the first-mentioned rotatable member for the said intermediate, rotatable member, and coacting axial abutments on the said rotatable section and the second-mentioned non-rotatable part of the rod.

5. An automatic slack adjuster for brakes, comprising in combination, a head, an extension sleeve on said head, a spindle having a screw threaded portion, a nut engaging said screw threaded portion, of said spindle, a tubular extension member secured to said nut and projecting into said head extension sleeve, a retaining ring secured to said tubular extension member at the end thereof opposite to said nut, coacting conical clutch surfaces on said retaining ring and said head extension sleeve, a friction clutch sleeve secured to said tubular nut extension member, a relatively rotatable friction clutch ring coacting with said friction clutch sleeve, a spring interposed between the retaining ring and the said clutch ring and biassing the said clutch ring towards the said clutch sleeve, an antifriction thrust bearing inserted at one end of the said spring, a rotatable casing mounted on the head extension sleeve and enclosing the said clutch ring, means for rotating said casing in opposite directions when braking and releasing the brake, respectively, camming threads on the rotatable casing and the head extension sleeve, said camming threads providing an axial play between them and being threaded in opposite direction to the coacting threads of the nut and spindle, the coacting threads of the nut and spindle being non-self-locking, a supporting face provided on said casing and coacting with said clutch ring to take up any tension between the head and the nut until the coacting clutch faces on the retaining ring and the head extension sleeve are engaged with each other through rotation of the said casing in the direction in which the camming threads of the rotatable casing and the head extension sleeve are threaded, and a coiled clutch spring wound in the direction opposite to that in which the camming threads of the rotatable casing and the head extension sleeve are threaded, and fitting aligned internal surfaces of the rotatable casing and the said clutch ring.

6. A slack adjuster as set forth in claim 4, in which the camming threads on said rotatable member and said second-mentioned non-rotatable part are non-selflocking.

7. A slack adjuster as set forth in claim 4, in which the camming threads on said rotatable member and said second-mentioned non-rotatable part are on the point of being non-self-locking.

8. An automatic slack adjuster as set forth in claim 5, in which the tubular nut extension member is provided with a collar having projecting studs to facilitate rotation of the nut by hand.

BERT HENRY BROWALL.